(12) United States Patent
Driker et al.

(10) Patent No.: US 8,543,632 B2
(45) Date of Patent: Sep. 24, 2013

(54) METHOD AND SYSTEM FOR COMPUTING ALIGNMENT STICKY BIT IN FLOATING-POINT OPERATIONS

(75) Inventors: Alexander Driker, San Diego, CA (US); Cristian Duroiu, San Diego, CA (US)

(73) Assignee: STMicroelectronics, Inc., Coppell, TX (US)

( * ) Notice: Subject to any disclaimer, the term of this patent is extended or adjusted under 35 U.S.C. 154(b) by 2051 days.

(21) Appl. No.: 10/458,946

(22) Filed: Jun. 11, 2003

(65) Prior Publication Data
US 2004/0254971 A1 Dec. 16, 2004

(51) Int. Cl.
*G06F 7/38* (2006.01)
(52) U.S. Cl.
USPC .......................................................... 708/499
(58) Field of Classification Search
USPC .......................................................... 708/499
See application file for complete search history.

(56) References Cited

U.S. PATENT DOCUMENTS

| | | | | |
|---|---|---|---|---|
| 4,864,527 A * | 9/1989 | Peng et al. | ..................... | 708/499 |
| 4,901,263 A * | 2/1990 | Ho et al. | ....................... | 708/209 |
| 5,113,364 A * | 5/1992 | Ho et al. | ....................... | 708/625 |
| 5,197,023 A * | 3/1993 | Nakayama | ..................... | 708/505 |
| 5,200,916 A * | 4/1993 | Yoshida | ........................ | 708/505 |
| 5,754,458 A * | 5/1998 | Beraha et al. | ................. | 708/497 |
| 5,771,183 A * | 6/1998 | Makineni | ..................... | 708/205 |

* cited by examiner

*Primary Examiner* — Tan V. Mai
(74) *Attorney, Agent, or Firm* — Munck Wilson Mandala, LLP (57) ABSTRACT

A method for computing the alignment sticky bit in floating-point operations is provided. The method includes computing a pre-computed sticky bit. A significand is aligned based on an alignment counter. A shifter sticky OR is computed. The alignment sticky bit is computed based on the pre-computed sticky bit by ORing the pre-computed sticky bit and the shifter sticky OR when the alignment counter comprises a value greater than or equal to a predefined value.

20 Claims, 6 Drawing Sheets

304 302 306

| ALIGN CENTER | SHIFTER CONTENTS | | | SHIFTED OUT |
|---|---|---|---|---|
| 0 | 1.11111111111111111111111 | 00 | | |
| 1 | 0.11111111111111111111111 | 10 | | |
| 2 | 0.01111111111111111111111 | 11 | | |
| 3 | 0.00111111111111111111111 | 11 | 1 | |
| 4 | 0.00011111111111111111111 | 11 | 11 | |
| 5 | 0.00001111111111111111111 | 11 | 111 | |
| 6 | 0.00000111111111111111111 | 11 | 1111 | |
| 7 | 0.00000011111111111111111 | 11 | 11111 | |
| 8 | 0.00000001111111111111111 | 11 | 111111 | |
| 9 | 0.00000000111111111111111 | 11 | 1111111 | |
| 10 | 0.00000000011111111111111 | 11 | 11111111 | |
| 11 | 0.00000000001111111111111 | 11 | 111111111 | |
| 12 | 0.00000000000111111111111 | 11 | 1111111111 | |
| 13 | 0.00000000000011111111111 | 11 | 11111111111 | |
| 14 | 0.00000000000001111111111 | 11 | 111111111111 | |
| 15 | 0.00000000000000111111111 | 11 | 1111111111111 | |
| 16 | 0.00000000000000011111111 | 11 | 11111111111111 | |
| 17 | 0.00000000000000001111111 | 11 | 11111111111111 | 1 |
| 18 | 0.00000000000000000111111 | 11 | 11111111111111 | 11 |
| 19 | 0.00000000000000000011111 | 11 | 11111111111111 | 111 |
| 20 | 0.00000000000000000001111 | 11 | 11111111111111 | 1111 |
| 21 | 0.00000000000000000000111 | 11 | 11111111111111 | 11111 |
| 22 | 0.00000000000000000000011 | 11 | 11111111111111 | 111111 |
| 23 | 0.00000000000000000000001 | 11 | 11111111111111 | 1111111 |
| 24 | 0.00000000000000000000000 | 11 | 11111111111111 | 11111111 |
| 25 | 0.00000000000000000000000 | 01 | 11111111111111 | 111111111 |
| 26 | 0.00000000000000000000000 | 00 | 11111111111111 | 1111111111 |

| ALIGN COUNT | STICKY EVALUATOR |
|---|---|
| 0 | BitOr(ShifterSticky) |
| ShS+2 | |
| ShS+2 OR ShS+3 | BitOr(ShifterSticky) \| BitOr($Sc_1$) |
| 2·ShS+2 | |
| 2·ShS+2 OR 2·ShS+3 | BitOr(ShifterSticky) \| BitOr($Sc_2$) |
| 3·ShS+2 | |
| ⋮ | ⋮ |
| k·ShS+2 OR k·ShS+3 | BitOr(ShifterSticky) \| BitOr($Sc_k$) |
| S+2 | |

*FIG. 6A*

| ALIGN COUNT | STICKY EVALUATOR |
|---|---|
| 0 | BitOr(ShifterSticky) |
| ShS+1 OR ShS+2 | |
| ShS+2 | BitOr(ShifterSticky) \| BitOr($Sc_1$) |
| 2·ShS+1 OR 2·ShS+2 | |
| 2·ShS+2 | BitOr(ShifterSticky) \| BitOr($Sc_2$) |
| 3·ShS+1 OR 3·ShS+2 | |
| ⋮ | ⋮ |
| k·ShS+2 | BitOr(ShifterSticky) \| BitOr($Sc_k$) |
| S+2 (NOTE) | |

*FIG. 6B*

| ALIGN COUNT | STICKY EVALUATOR |
|---|---|
| 0 | BitOr(ShifterSticky) |
| ShS-1 OR ShS | |
| ShS | BitOr(ShifterSticky) \| BitOr($Sc_1$) |
| 2·ShS-1 OR 2·ShS | |
| 2·ShS | BitOr(ShifterSticky) \| BitOr($Sc_2$) |
| 3·ShS-1 OR 3·ShS | |
| ⋮ | ⋮ |
| k·ShS | BitOr(ShifterSticky) \| BitOr($Sc_k$) |
| S+2 | |

*FIG. 7A*

| ALIGN COUNT | STICKY EVALUATOR |
|---|---|
| 0 | BitOr(ShifterSticky) |
| ShS-1 | |
| ShS | BitOr(ShifterSticky) \| BitOr($Sc_1$) |
| 2·ShS-1 | |
| 2·ShS | BitOr(ShifterSticky) \| BitOr($Sc_2$) |
| 3·ShS-1 | |
| ⋮ | ⋮ |
| k·ShS | BitOr(ShifterSticky) \| BitOr($Sc_k$) |
| (k+1)·ShS-1* | |

METHOD AND SYSTEM FOR COMPUTING ALIGNMENT STICKY BIT IN FLOATING-POINT OPERATIONS

TECHNICAL FIELD OF THE INVENTION

The present invention is directed in general to floating-point computation and, more specifically, to a method and system for computing the alignment sticky bit in floating-point operations.

BACKGROUND OF THE INVENTION

Floating-point computation is important in many domains requiring a high degree of precision and dynamic range, including many embedded applications such as coefficient computation for digital subscriber line modems, graphics, and the like.

Floating-point numbers are stored in three parts: a sign, a mantissa and an exponent. A typical representation of a floating-point number is as follows:

$$(-1)^S * 1.xxxx * 2^{yyyy},$$

where S is the sign, xxxx is the mantissa and yyyy is the exponent. The floating-point number is positive when S is 0 and negative when S is 1. The 1.xxxx is usually referred to as the "significand" of the floating-point number. The sign and significand together create a "sign-magnitude" representation. The position to the left of the decimal point in the significand is called the "integer" bit. The integer bit can be either explicitly included in a floating-point format or excluded. When the integer bit is excluded, it is called a "hidden" integer bit. For example, the Institute of Electrical and Electronics Engineers (IEEE) 754 floating-point standard defines Single-Precision and Double-Precision floating-point numbers having hidden integer bits. The size of the mantissa and the size of the exponent may vary depending on the type of precision used.

In performing floating-point operations, conventional floating-point units align the two operands. During alignment, the floating-point unit compares the exponents of the two operands and increases the smaller exponent such that it is equal to the larger exponent. In order to keep the smaller operand the same value, the floating-point unit also right-shifts the significand of the smaller operand. If the least significant bits of the significand that are shifted out are lost, information is lost. Therefore, conventional floating-point units store some of the bits that are shifted out in order to maintain precision.

Typically, three of these bits are stored, and they are known as the guard, round and sticky bits. The floating-point unit right-shifts data from the significand into the guard bit and the round bit. Thus, these bits are simply the two most recently shifted out bits. The sticky bit is the logical OR of all the bits that are less significant than the round bit.

Many techniques have been developed to calculate the sticky bit. For example, a conventional technique includes building a mask, building a selector of different size or results, building a trailing zero counter and comparing with the alignment counter. However, because the goal is generally to calculate the guard, round and sticky bits as quickly as possible regardless of implementation cost, conventional techniques fail to balance the speed and implementation complexity of the calculation, which is especially important for adding floating-point support to an integer processor pipeline and other similar types of applications.

SUMMARY OF THE INVENTION

In accordance with the present invention, a method and system for computing the alignment sticky bit in floating-point operations are provided that substantially eliminate or reduce disadvantages and problems associated with conventional systems and methods.

According to one embodiment of the present invention, a method for computing the alignment sticky bit in floating-point operations is provided. The method includes computing a pre-computed sticky bit. A significand is aligned based on an alignment count. A shifter sticky OR is computed. The alignment sticky bit is computed based on the pre-computed sticky bit by ORing the pre-computed sticky bit and the shifter sticky OR when the alignment counter comprises a value greater than or equal to a predefined value.

According to another embodiment of the present invention, a method for computing the alignment sticky bit in floating-point operations is provided that includes computing a plurality of sticky group ORs. A plurality of sticky group cluster ORs are computed. The alignment sticky bit is computed based on the sticky group cluster Ors together with a shifter sticky OR.

According to yet another embodiment of the present invention, a method for computing the alignment sticky bit in floating-point operations is provided that includes determining n for a shifter sticky of size $2^n$. The n least significant bits of an alignment counter are discarded and a value, x, that is encoded in the remaining bits of the alignment counter is determined. A plurality of sticky group ORs is computed. A sticky group bit array of size 2 k is initialized. The sticky group bit array is right-shifted by x bits. The alignment sticky bit is computed based on the right-shifted sticky group bit array together with a shifter sticky OR.

Technical advantages of one or more embodiments of the present invention include providing an improved method for computing the alignment sticky bit in floating-point operations. In a particular embodiment, at least a portion of the alignment sticky bit may be computed in parallel with the alignment process. Accordingly, the speed and implementation complexity of the floating-point operations may be balanced, which is especially important for adding floating-point support to integer processor pipelines and/or other similar types of applications.

Other technical advantages will be readily apparent to one skilled in the art from the following figures, description, and claims.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 1 through 10, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged floating-point unit.

Figure 1:
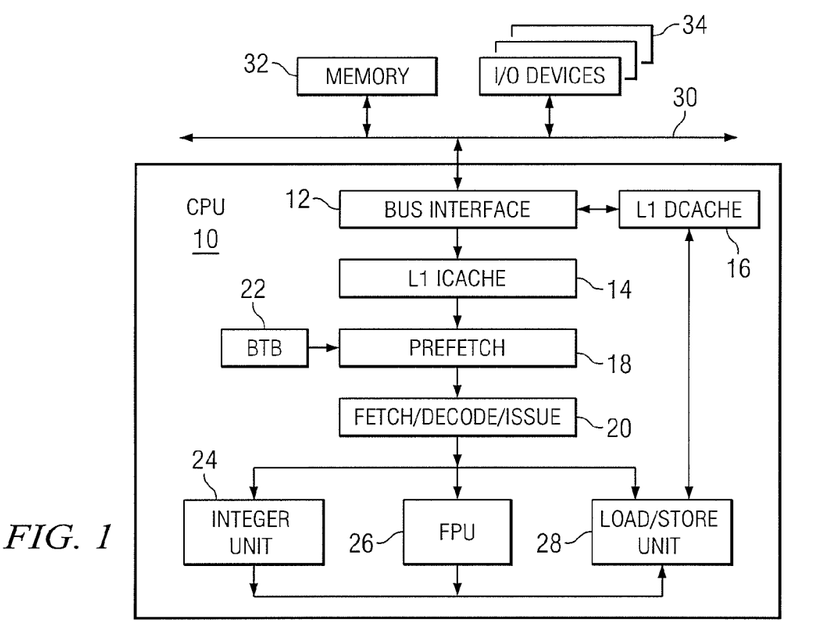
FIG. 1 is a block diagram illustrating a central processing unit in accordance with one embodiment of the present invention.

FIG. 1 is a block diagram illustrating a central processing unit (CPU) 10 in accordance with one embodiment of the present invention. In the illustrated embodiment, the central processing unit 10 comprises a bus interface unit (BUI) 12, a level 1 (L1) instruction cache (ICACHE) 14, an L1 data cache (DCACHE) 16, an instruction prefetch buffer 18, an instruction fetch/decode unit 20, a branch target buffer (BTB) 22, an integer unit 24, a floating-point unit (FPU) 26, and a load/store unit 28.

The bus interface unit 12 is operable to facilitate communication between the central processing unit 10 and a system bus 30. The bus interface unit 12 comprises any hardware, software, firmware, or combination thereof that is operable to facilitate communication over a bus. The system bus 30 comprises any suitable structure that is operable to transport information to and from the central processing unit 10.

In this embodiment, the system bus 30 is operable to facilitate communication between the central processing unit 10, a main memory 32, and one or more input/output (I/O) devices 34. The main memory 32 is operable to store information used by the central processing unit 10, such as instructions to be executed by the central processing unit 10 and data to be used during execution of the instructions. The main memory 32 comprises any volatile or non-volatile storage and retrieval device. The I/O devices 34 comprise any suitable input or output devices, such as a keyboard, mouse, disk drive, CD drive, DVD drive, monitor, or the like.

The central processing unit 10 is operable to retrieve data and instructions from the main memory 32. When the central processing unit 10 receives instructions and data, the bus interface unit 12 stores the instructions in the instruction cache 14 and the data in the data cache 16. Each of the instruction cache 14 and the data cache 16 comprises any suitable storage and retrieval device. In a particular embodiment, each of the instruction cache 14 and the data cache 16 comprises a four-way set associative memory having a sixteen-byte line size and implementing a least recently used (LRU) replacement algorithm.

The instruction prefetch buffer 18 is operable to retrieve and store at least some of the instructions contained in the instruction cache 14. The prefetch buffer 18 comprises any buffer that is operable to store and facilitate retrieval of instructions. The prefetch buffer 18 is provided to store instructions before the instructions are fetched by the instruction fetch/decode unit 20. As instructions are sent to the instruction fetch/decode unit 20, new instructions are retrieved from the instruction cache 14. In this way, the prefetch buffer 18 may help to ensure that the instruction fetch/decode unit 20 has a continuous flow of instructions.

The instruction fetch/decode unit 20 is operable to fetch instructions to be executed by the central processing unit 10. The instruction fetch/decode unit 20 is also operable to decode the instructions and issue the decoded instructions to other components of the central processing unit 10 for execution. The instruction fetch/decode unit 20 comprises any hardware, software, firmware, or combination thereof that is operable to fetch, decode, and issue instructions.

In some embodiments, the instructions executed by the central processing unit 10 may be executed in sequential order unless "branch" or "jump" instructions change the order of execution. The target address of a branch or jump instruction is predicted and stored in the branch target buffer 22. When a branch or jump instruction is encountered during execution, the address of the next non-sequential instruction may be retrieved from the branch target buffer 22 and used. The branch target buffer 22 comprises any buffer that is operable to store and facilitate retrieval of addresses.

Instructions decoded by the instruction fetch/decode unit 20 may be issued to the integer unit 24, the floating-point unit 26, or the load/store unit 28. The integer unit 24 is operable to execute integer instructions retrieved by the central processing unit 10 from the main memory 32. The integer unit 24 is also operable to calculate memory addresses used by the load/store unit 28. The integer unit 24 comprises any hardware, software, firmware, or combination thereof that is operable to perform integer operations.

The floating-point unit 26 is operable to execute floating-point instructions retrieved by the central processing unit 10 from the main memory 32. For example, the floating-point unit 26 is operable to execute floating-point operations, such as addition, subtraction, multiplication and division. The floating-point unit is operable to perform "effective addition" and "effective subtraction," also. The phrase effective addition refers to a mathematical operation that, in effect, adds two operands. As an example, an effective addition may represent the addition of two positive operands or the subtraction of a negative operand from a positive operand. Similarly, the phrase "effective subtraction" refers to a mathematical operation that, in effect, subtracts one operand from another operand. As an example, an effective subtraction may represent the subtraction of one positive operand from another positive operand or the addition of a positive operand and a negative operand.

As described in more detail below, the floating-point unit 26 is also operable to compute the alignment sticky bit, hereafter referred to as the sticky bit, in parallel with the alignment process by pre-computing at least a portion of the sticky bit. The floating-point unit 26 comprises any hardware, software, firmware, or combination thereof that is operable to perform floating-point operations.

The load/store unit 28 is operable to facilitate the retrieval and storage of data in the main memory 32. For example, the load/store unit 28 may be operable to store the results of a floating-point operation in the main memory 32. The load/store unit 28 comprises any hardware, software, firmware, or combination thereof that is operable to load or store data.

Figure 2:
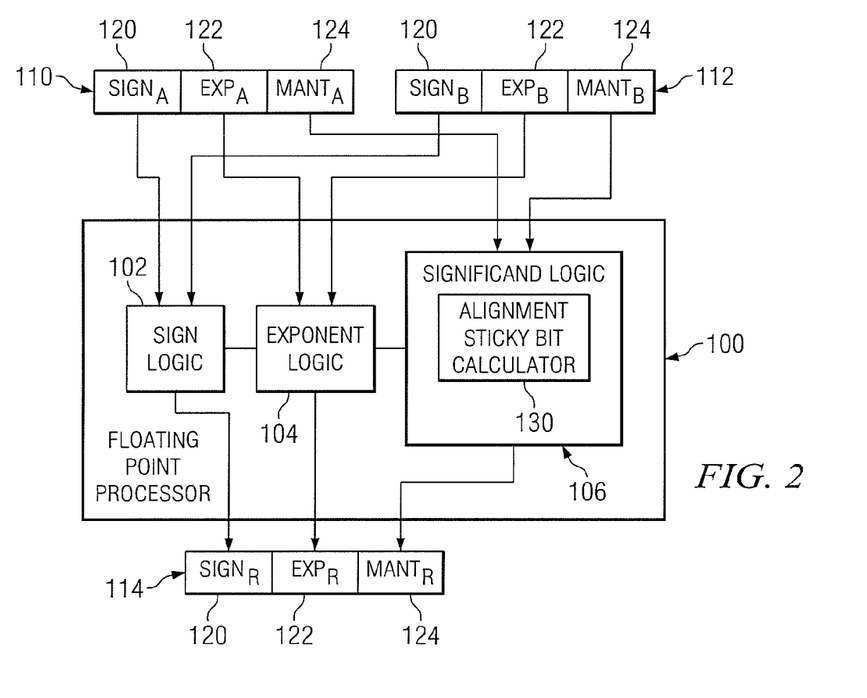
FIG. 2 is a block diagram illustrating a floating-point unit in accordance with one embodiment of the present invention.

FIG. 2 is a block diagram illustrating a floating-point unit 100 in accordance with one embodiment of the present invention. According to one embodiment, the floating-point unit 100 may be used as the floating-point unit 26 in the central processing unit 10. However, it will be understood that the floating-point unit 100 may be used in any other central processing unit or other suitable device without departing from the scope of the present invention.

The floating-point unit 100 is operable to perform operations on floating-point numbers. For at least some floating-point operations, the floating-point unit 100 is also operable to compute the sticky bit in parallel with the alignment process. In order to accomplish this, the floating-point unit 100 is operable to pre-compute at least a portion of the sticky bit, as described in more detail below.

The floating-point unit 100 comprises sign logic 102, exponent logic 104, and significand logic 106. Although illustrated as separate components, it will be understood that any two or all of the sign logic 102, the exponent logic 104, and the significand logic 106 may be implemented as a single component without departing from the scope of the present invention.

The floating-point unit 100 is operable to receive a first operand 110 and a second operand 112 and to generate a result operand 114 based on the first and second operands 110 and 112. For example, for addition operations, the floating-point unit 100 is operable to add the first operand 110 to the second operand 112 in order to generate the result operand 114.

Each of the operands 110, 112 and 114 comprises a sign component 120, an exponent component 122, and a mantissa component 124. In performing the operations on the operands 110 and 112, the floating-point unit 100 is operable to receive the sign components 120 from each of the operands 110 and 112, together with the specific operation (e.g., addition, subtraction, or the like), at the sign logic 102, to receive the exponent components 122 from each of the operands 110 and 112 at the exponent logic 104, and to receive the mantissa components 124 from each of the operands 110 and 112, and alignment count together with special cases information, at the significand logic 106.

After performing the operation, the floating-point unit 100 is operable to generate the sign component 120 of the result operand 114 with the sign logic 102, to generate the exponent component 122 of the result operand 114 with the exponent logic 104 (in concert with the sign and significand logic 102 and 106), and to generate the mantissa component 124 of the result operand 114 with the significand logic 106 (in concert with the sign and exponent logic 102 and 104).

The significand logic 106 comprises an alignment sticky bit calculator 130 that is operable to pre-compute at least a portion of the sticky bit in parallel with the alignment process during at least some floating-point operations, as described in more detail below.

Figure 3:
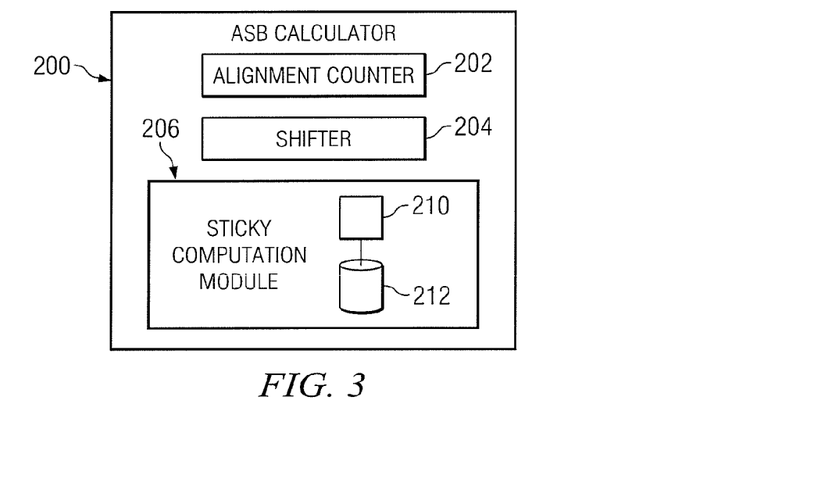
FIG. 3 is a block diagram illustrating the alignment sticky bit calculator of FIG. 2 in accordance with one embodiment of the present invention.

FIG. 3 is a block diagram illustrating an alignment sticky bit (ASB) calculator 200 in accordance with one embodiment of the present invention. According to one embodiment, the alignment sticky bit calculator 200 may be used as the alignment sticky bit calculator 130 in the floating-point unit 100. However, it will be understood that the alignment sticky bit calculator 200 may be used in any other suitable floating-point application without departing from the scope of the present invention.

The alignment sticky bit calculator 200 comprises an alignment counter 202, a shifter 204, and a sticky computation module 206. Although illustrated as separate components, it will be understood that any two or all of the alignment counter 202, the shifter 204, and the sticky computation module 206 may be implemented as a single component without departing from the scope of the present invention.

The alignment counter 202 comprises a value that is the difference between the exponent components 122 of the operands 110 and 112 to be added, which corresponds to the size of the shift to be used for alignment of the smaller operand 110 or 112.

According to the embodiment described in connection with FIG. 4, the shifter 204 comprises a significand, a guard bit, a round bit, and shifter sticky bits. According to the embodiment described in connection with FIGS. 6 and 7, the shifter 204 comprises a plurality of sticky groups, a plurality of sticky group clusters, a guard bit, a round bit, and shifter sticky bits.

The sticky computation module 206 may comprise one or more processors 210 that are operable to execute instructions and one or more memories 212 that are operable to store instructions and data used by the processors 210. According to the embodiment described in connection with FIG. 4, the sticky computation module 206 is operable to pre-compute at least a portion of the sticky bit in parallel with the alignment process and to compute the sticky bit based on the alignment counter 202. According to the embodiment described in connection with FIGS. 6A-B and 7A-B, the sticky computation module 206 is operable, in parallel with the alignment process, to pre-compute sticky groups and sticky group clusters, to determine into which alignment range the alignment counter 202 falls, and to identify a sticky evaluator based on the alignment range, and the sticky computation module 206 is also operable to compute the sticky bit based on the sticky evaluator.

Any one or more components of the alignment sticky bit calculator 200 may comprise logic encoded in media. The logic comprises functional instructions for carrying out program tasks. The media comprises computer disks or other computer-readable media, application-specific integrated circuits, field-programmable gate arrays, digital signal processors, other suitable specific or general purpose processors, transmission media or other suitable media in which logic may be encoded and utilized.

Figure 4:
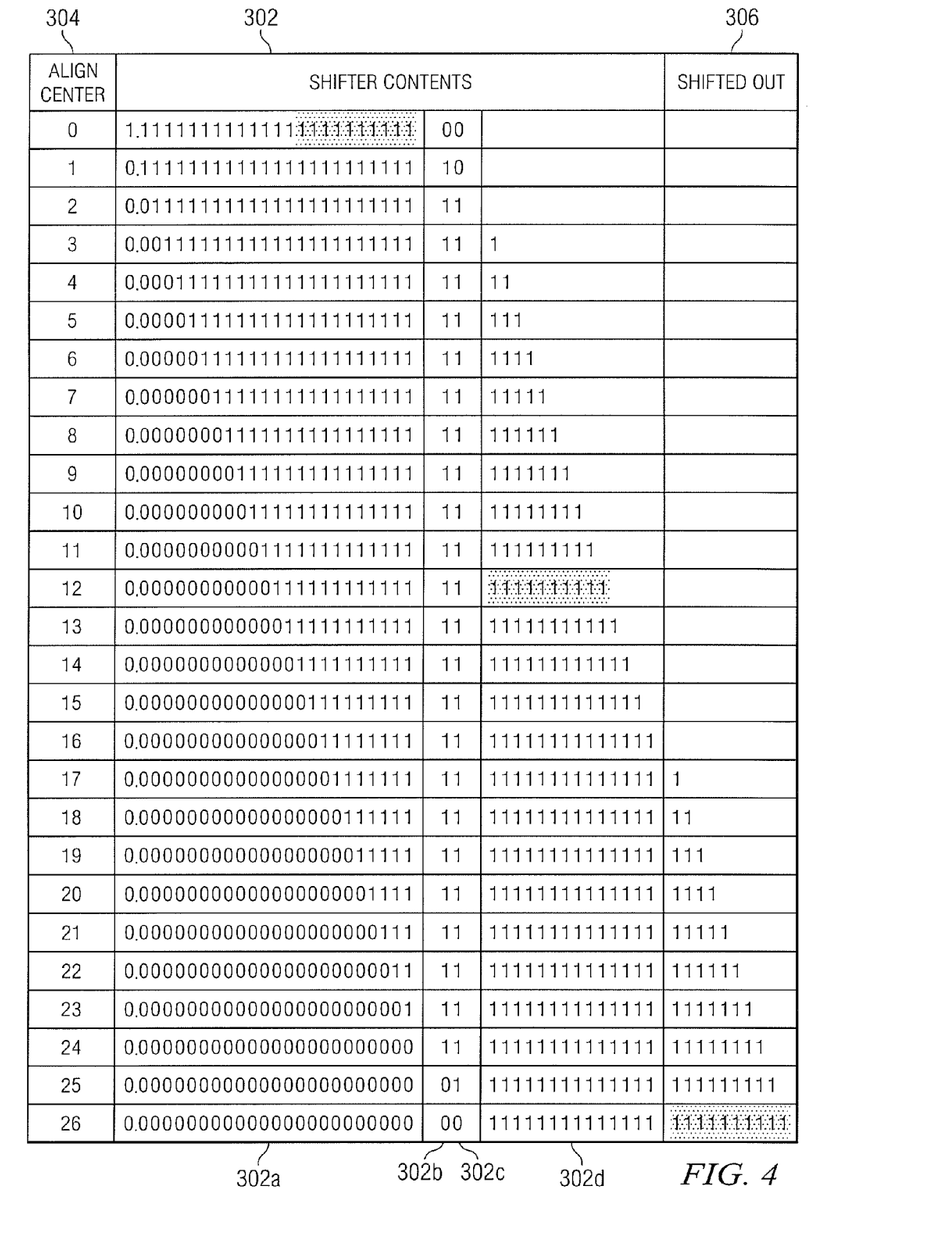
FIG. 4 is a shifter table illustrating possible contents of the shifter of FIG. 3 in accordance with one embodiment of the present invention.

FIG. 4 is a shifter table 300 illustrating possible contents 302 of the shifter 204 in accordance with one embodiment of the present invention. The shifter table 300 also illustrates the contents 304 of the alignment counter 202 and the bits 306 that have been shifted out of the shifter 204.

According to the illustrated embodiment (IEEE 754 standard Single-Precision floating-point format), the alignment counter contents 304 comprise a value between zero and 26, the shifter contents 302 comprise 24 bits of an aligned significand 302a, one bit for the guard bit 302b, one bit for the round bit 302c, and fourteen shifter sticky bits 302d, and the shifted out bits 306 comprise up to ten bits. However, it will be understood that the shifter contents 302 and the shifted out bits 306 may comprise any suitable number of bits and the alignment counter contents 304 may comprise any suitable values without departing from the scope of the present invention.

For the illustrated embodiment, significand bits begin to be shifted out of the shifter contents 302 when the alignment counter content 304 is 17. Thus, these shifted out bits 306 would be lost for alignment counter contents 304 of 17 and higher. In order to retain the data from the shifted out bits 306, the sticky computation module 206 computes the logical OR of the 10 least significant bits of the significand before alignment and stores the result, which will be referred to hereafter as the pre-computed sticky bit.

The 10 least significant bits, which are shown in gray, are used because 10 is the maximum number of shifted out bits 306. For other embodiments, therefore, the number of least significant bits used to compute the pre-computed sticky bit is the maximum number of shifted out bits 306, which corresponds to the number of shifted out bits 306 for the maximum value of the alignment counter content 304.

To compute the sticky bit, the fourteen least significant bits of the shifter contents 302, which are the shifter sticky bits 302d, are ORed. When the value of the alignment counter content 304 is 16 or less, this result is the sticky bit because there are no shifted out bits 306. However, when the value of the alignment counter content 304 is 17 or more, this result is ORed with the pre-computed sticky bit to generate the sticky bit.

In addition, when the alignment counter content 304 is between 12 and 16, the pre-computed sticky bit may be ORed with the OR of the shifter sticky bits 302d (hereafter referred to as the shifter sticky OR) without affecting the result because the bits ORed together to generate the pre-computed sticky bit are all shifter sticky bits 302d. Thus, according to one embodiment, the alignment counter content 304 may be checked for values of 16 or more, instead of 17 or more, in order to determine whether or not to OR the pre-computed sticky bit with the shifter sticky OR. For this embodiment, a single bit may be checked: if the fifth least significant bit of the alignment counter 202 is 1, the pre-computed sticky bit is ORed with the shifter sticky OR; otherwise, the pre-computed sticky bit is not ORed with the shifter sticky OR.

Figure 5:
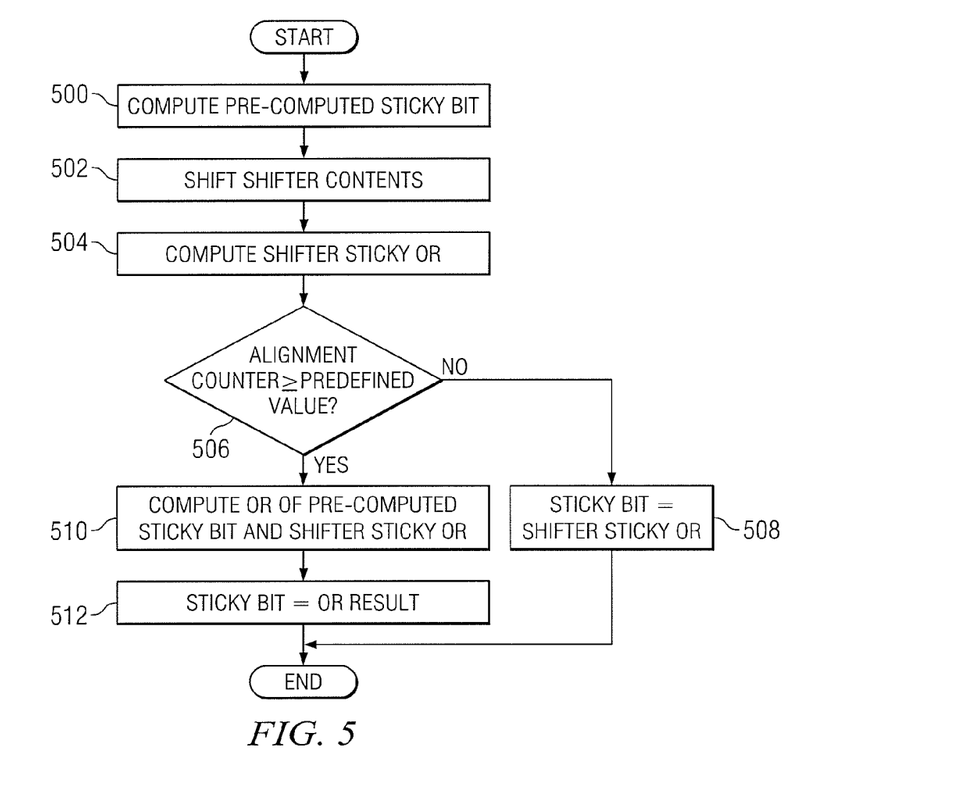
FIG. 5 is a flow diagram illustrating a method for computing the alignment sticky bit in floating-point operations using the alignment sticky bit calculator of FIG. 3 in accordance with the embodiment described in FIG. 4.

FIG. 5 is a flow diagram illustrating a method for computing the sticky bit in floating-point operations using the alignment sticky bit calculator 200 in accordance with the embodiment described in FIG. 4. The method begins at step 500 where the sticky computation module 206 computes the pre-computed sticky bit by ORing the 10 least significant bits of the significand.

At step 502, the alignment sticky bit calculator 200 shifts the contents 302 of the shifter 204 to the right based on the alignment counter 202. For example, if the alignment counter 202 is 19, the contents 302 of the shifter 204 are right-shifted by 19 bits. At step 504, the sticky computation module 206 computes the shifter sticky OR by ORing the shifter sticky bits 302d.

At decisional step 506, the sticky computation module 206 makes a determination regarding whether or not the alignment counter 202 is greater than or equal to a predefined value. According to one embodiment, the predefined value comprises 16. However, as described above in connection with FIG. 4, it will be understood that the predefined value may comprise any suitable number without departing from the present invention.

If the alignment counter 202 is not greater than or equal to the predefined value, the method follows the No branch from decisional step 506 to step 508. At step 508, the alignment sticky bit calculator 200 provides the shifter sticky OR as the sticky bit, at which point the method comes to an end.

Returning to decisional step 506, if the alignment counter 202 is greater than or equal to the predefined value, the method follows the Yes branch from decisional step 506 to step 510. At step 510, the sticky computation module 206 computes the OR of the pre-computed sticky bit and the shifter sticky OR. At step 512, the alignment sticky bit calculator 200 provides the OR result as the sticky bit, at which point the method comes to an end.

Figure 6A:
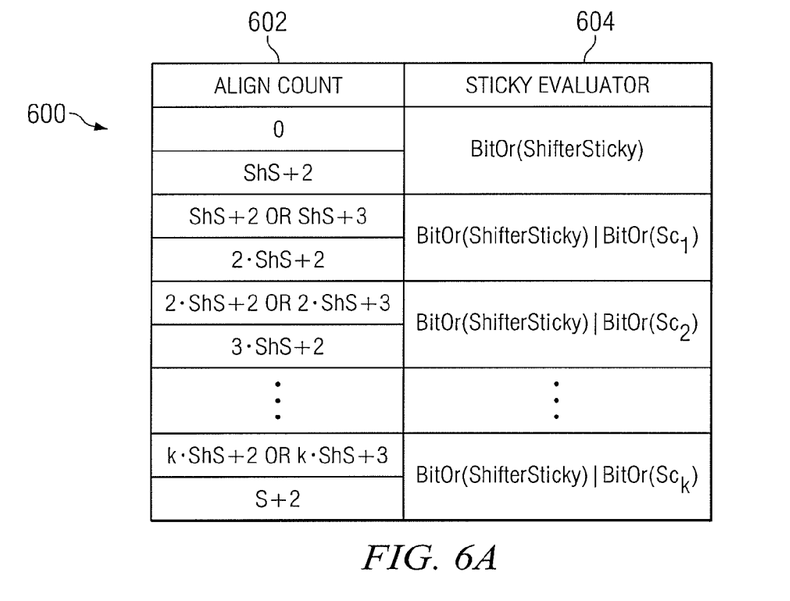
FIGS. 6A and 6B are sticky evaluator tables illustrating possible contents of the memory of the sticky computation module of FIG. 3 in accordance with one embodiment of the present invention.
Figure 6B:
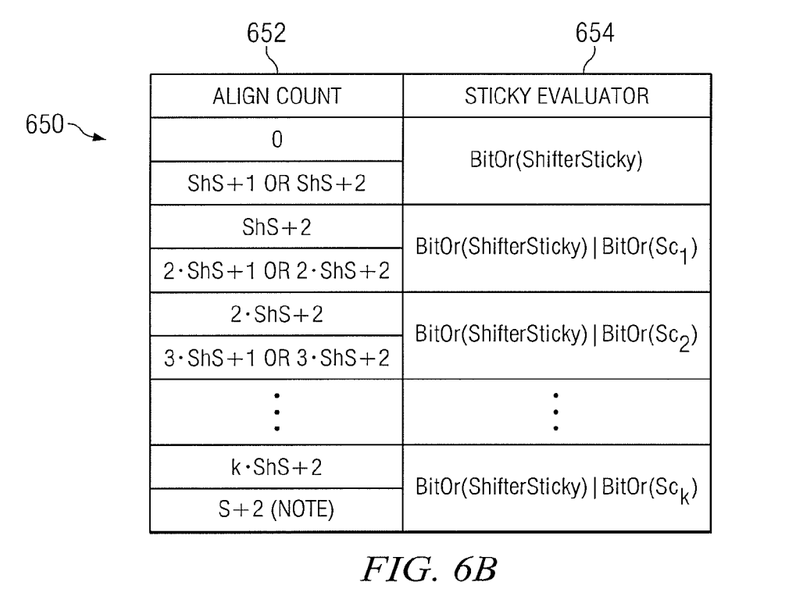
Figure 7A:
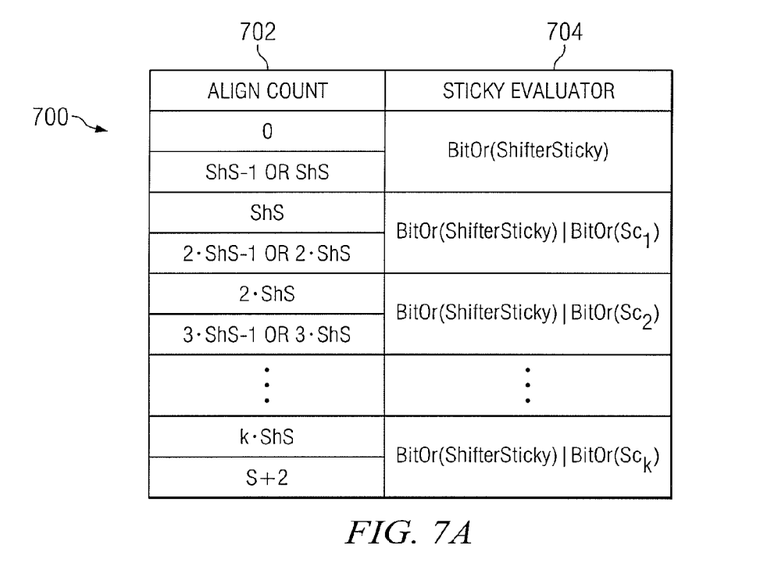
FIGS. 7A and 7B are sticky evaluator tables illustrating possible contents of the memory of the sticky computation module of FIG. 3 in accordance with another embodiment of the present invention.
Figure 7B:
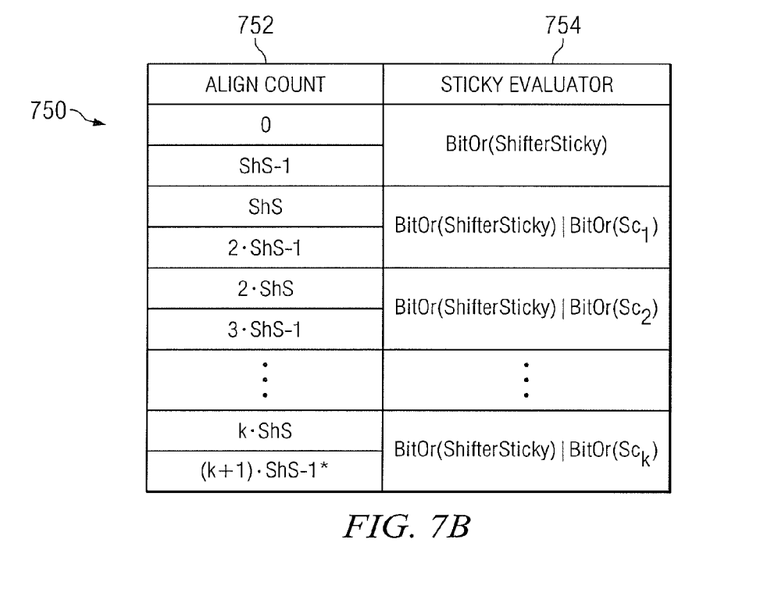
Figure 8:
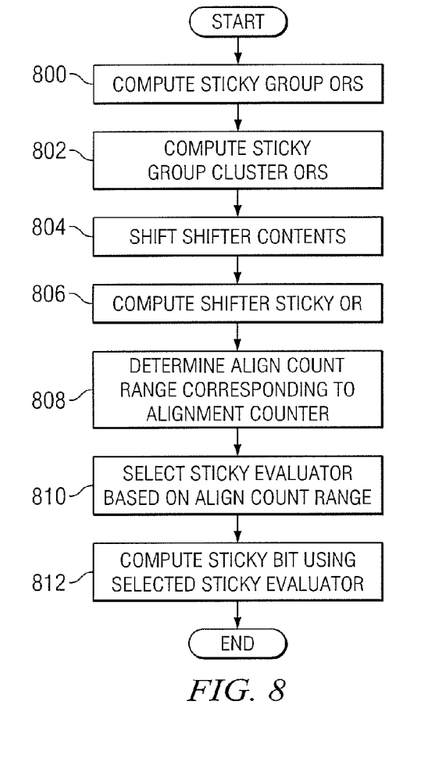
FIG. 8 is a flow diagram illustrating a method for computing the alignment sticky bit in floating-point operations using the alignment sticky bit calculator of FIG. 3 in accordance with the embodiments described in FIGS. 6 and 7.

Another embodiment of the present invention is illustrated in FIGS. 6-8. According to this embodiment, the bits of the shifter 204 are grouped together in sticky groups and the sticky groups are further grouped into sticky group clusters. According to one embodiment, one sticky group cluster is provided for each sticky group. For this embodiment, the first sticky group cluster comprises the first sticky group, the second sticky group cluster comprises the first and second sticky groups, the $n^{th}$ sticky group cluster comprises the first through $n^{th}$ sticky groups, and so on.

For this embodiment, the sticky computation module 206 is operable to pre-compute at least a portion of the sticky bit by (i) computing the sticky group ORs by, for each sticky group OR, ORing the bits in the corresponding sticky group, and (ii) computing the sticky group cluster ORs by, for each sticky group cluster OR, ORing the sticky group ORs of the sticky groups in the corresponding sticky group cluster.

In a particular embodiment, described in FIGS. 6A and 6B, each sticky group comprises a specified number, x, of significand bits. Thus, the x least significant significand bits comprise a first sticky group, the next x least significant significand bits comprise a second sticky group, and so on until the last group of x bits is reached. A final group may be smaller than x.

FIGS. 6A and 6B are sticky evaluator tables 600 and 650, respectively, illustrating possible contents of the memory 212 of the sticky computation module 206 in accordance with one embodiment of the present invention. It will be understood that the memory 212 may also comprise other suitable contents without departing from the scope of the present invention. Other memory-less implementations are also possible.

The align count ranges 602, 652, which correspond to ranges of values in the alignment counter 202, are used to select a sticky evaluator 604, 654 for use in computing the sticky bit. Thus, for example, for an alignment counter 202 greater than ShS+2 and less than 2ShS+2, the sticky computation module 206 is operable, based on the align count range 602, 652, to compute the sticky bit using the following sticky evaluator 604, 654:

BitOr(ShifterSticky)|BitOr($Sc_1$), where ShS is the number of shifter sticky bits 302d, BitOr (ShifterSticky) is the OR of the shifter sticky bits 302d, and BitOr($Sc_i$) is the sticky group cluster OR for the ith sticky group cluster, which is pre-computed by the sticky computation module 206. Therefore, in order to compute the sticky bit, the sticky computation module 206 merely has to compute the OR of the shifter sticky bits 302d and OR that result with the pre-computed sticky group cluster OR.

Although the sticky computation module 206 may use either sticky evaluator table 600 or 650 to select a sticky evaluator 604, 654, in one embodiment the sticky computation module 206 is operable to select one of the tables 600 or 650 based on which align count ranges 602, 652 comprise values that correspond to powers-of-2. For example, if the number of shifter sticky bits 302d, or ShS, is 5, then ShS+3 corresponds to 8, which is $2^3$. In this situation, the sticky computation module 206 may use the table 600. In this way, the sticky computation module 206 may more easily determine into which align count range 602, 652 the alignment counter 202 falls.

It will be noted that, while the exponent differences corresponding to the alignment counter 202 may be larger than S+2, these differences are mapped to S+2 for the corresponding alignment counters 202 in order to select a sticky evaluator 604, 654.

In another particular embodiment, described in FIGS. 7A and 7B, each sticky group comprises a specified number, x, of bits. The first sticky group comprises x–2 significand bits and the guard and round bits, which are both initially zero. The next x least significant significand bits comprise a second sticky group, and so on until the last group of x bits is reached. A final group may be smaller than x.

FIGS. 7A and 7B are sticky evaluator tables 700 and 750, respectively, illustrating possible contents of the memory 212 of the sticky computation module 206 in accordance with a second embodiment of the present invention. It will be understood that the memory 212 may also comprise other suitable contents without departing from the scope of the present invention. Other memory-less implementations are also possible.

The align count ranges 702, 752, which correspond to ranges of values in the alignment counter 202, are used to select a sticky evaluator 704, 754 for use in computing the sticky bit. Thus, for example, for an alignment counter 202 greater than ShS and less than 2ShS, the sticky computation module 206 is operable, based on the align count range 702, 752, to compute the sticky bit using the following sticky evaluator 704, 754:

BitOr(ShifterSticky)|BitOr($Sc_1$), where ShS is the number of shifter sticky bits 302d, BitOr (ShifterSticky) is the OR of the shifter sticky bits 302d, and BitOr($Sc_i$) is the sticky group cluster OR for the ith sticky group cluster, which is pre-computed by the sticky computation module 206. Thus, in order to compute the sticky bit, the sticky computation module 206 merely has to compute the OR of the shifter sticky bits 302d and OR that result with the pre-computed sticky group cluster OR.

The sticky computation module 206 may use the sticky evaluator table 700 to select a sticky evaluator 704 when the sticky group size, x, is any suitable number. However, for simplicity, the sticky computation module 206 may use the sticky evaluator table 750 to select a sticky evaluator 754 when the sticky group size, x, is a number that comprises a power-of-2. This embodiment allows the sticky computation module 206 to more easily determine into which align count range 752 the alignment counter 202 falls.

It will be noted that, while the exponent differences corresponding to the alignment counter 202 may be larger than S+2, these differences are mapped to S+2 for the corresponding alignment counters 202 in order to select a sticky evaluator 704 with the table 700. For the table 750, the alignment counters 202 are still limited to S+2; however, using the power-of-2 sticky group size, and corresponding align count range 752, allows for easier align count range 752 determination.

FIG. 8 is a flow diagram illustrating a method for computing the sticky bit in floating-point operations using the alignment sticky bit calculator 200 in accordance with the embodiments described in FIGS. 6 and 7. The method begins at step 800 where the sticky computation module 206 computes the sticky group ORs by, for each sticky group OR, ORing the bits in the corresponding sticky group. At step 802, the sticky computation module 206 computes the sticky group cluster ORs by, for each sticky group cluster OR, ORing the sticky group ORs of the sticky groups in the corresponding sticky group cluster.

At step 804, the alignment sticky bit calculator 200 shifts the contents 302 of the shifter 204 to the right based on the alignment counter 202. For example, if the alignment counter 202 is 19, the contents 302 of the shifter 204 are right-shifted by 19 bits. At step 806, the sticky computation module 206 computes the shifter sticky OR by ORing the shifter sticky bits 302d.

At step 808, the sticky computation module 206 determines into which align count range 602, 652, 702, 752 the alignment counter 202 falls. At step 810, the sticky computation module 206 selects a sticky evaluator 604, 654, 704, 754 based on the align count range 602, 652, 702, 752. At step 812, the sticky computation module 206 computes the sticky bit using the selected sticky evaluator 604, 654, 704, 754, at which point the method comes to an end.

Figure 9:
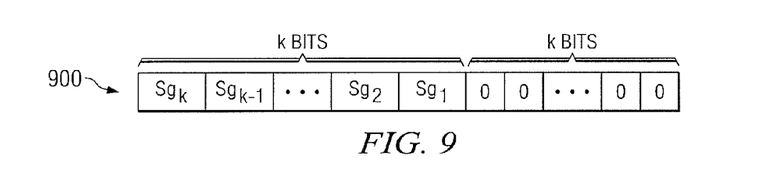
FIG. 9 is a block diagram illustrating a sticky group bit array for computing the alignment sticky bit in accordance with another embodiment of the present invention.

FIG. 9 is a block diagram illustrating a sticky group bit array 900 for computing the sticky bit in situations in which the sticky group size, x, is a power-of-2 in accordance with another embodiment of the present invention. According to one embodiment, the sticky group bit array 900 is stored in the memory 212 of the sticky computation module 206. However, it will be understood that the sticky group bit array 900 may be stored in any suitable location without departing from the scope of the present invention.

The sticky group bit array 900 comprises 2 k bits, where k corresponds to the specified number of sticky groups. The k least significant bits are initialized to zeros. The k most significant bits are initialized to correspond to the k sticky group ORs. The sticky group bit array 900 may be used to compute the sticky bit, as described in more detail below.

Figure 10:
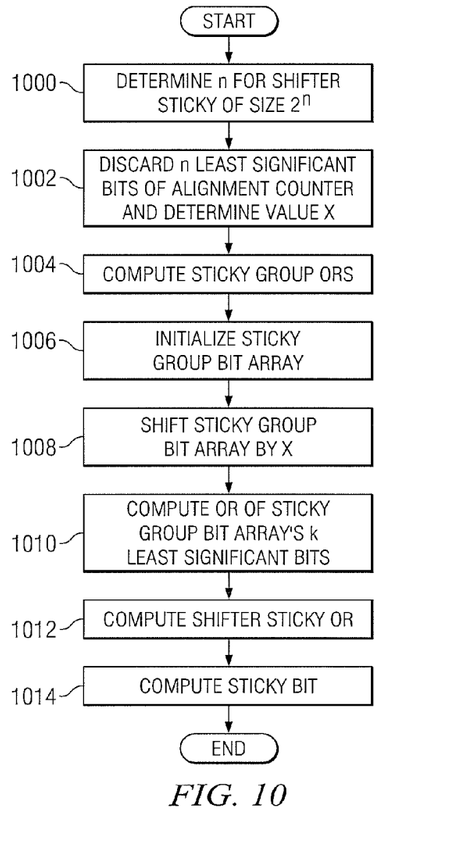
FIG. 10 is a flow diagram illustrating a method for computing the alignment sticky bit in floating-point operations using the alignment sticky bit calculator of FIG. 3 in accordance with the embodiments described in FIG. 9, along with the embodiment described in either FIG. 4 or FIGS. 6 and 7.

FIG. 10 is a flow diagram illustrating a method for computing the sticky bit in floating-point operations using the alignment sticky bit calculator 200 in accordance with the embodiment described in FIG. 9, along with the embodiments described in either FIG. 4 or FIGS. 6 and 7.

The method begins at step 1000 where the sticky computation module 206 determines the number, n, for a shifter sticky group size of 2. At step 1002, the sticky computation module 206 discards the n least significant bits of the alignment counter 202 and determines a value, x, encoded in the remaining bits of the alignment counter 202. At step 1004, the sticky computation module 206 computes sticky group ORs by, for each sticky group OR, ORing the bits in the corresponding sticky group.

At step 1006, the sticky computation module 206 initializes the 2 k-bit sticky group bit array 900 based on the sticky group ORs. As described above in connection with FIG. 9, the sticky group bit array 900 is initialized by setting the k least significant bits to zeros and the k most significant bits to correspond to the sticky group ORs. At step 1008, the alignment sticky bit calculator 200 shifts the sticky group bit array 900 to the right by x bits.

At step 1010, the sticky computation module 206 computes the OR of the k least significant bits of the sticky group bit array 900. At step 1012, the sticky computation module 206 computes the shifter sticky OR by ORing the shifter sticky bits 302*d*. At step 1014, the sticky computation module 206 computes the sticky bit by ORing the sticky group bit array OR and the shifter sticky OR, at which point the method comes to an end.

Although the present invention has been described with several embodiments, various changes and modifications may be suggested to one skilled in the art. It is intended that the present invention encompass such changes and modifications as fall within the scope of the appended claims. For example, the invention may be implemented in situations in which the bits are ANDed instead of ORed, which may be useful in some implementations.

What is claimed is:

1. A method for computing the alignment sticky bit in floating-point operations, comprising:
   computing a pre-computed sticky bit by a sticky computation module that includes at least one processor and at least one memory, the sticky computation module part of a hardware floating-point unit of a central processing unit;
   computing the alignment sticky bit based on the pre-computed sticky bit by an alignment sticky bit calculator that includes an alignment counter, a shifter, and the sticky computation module;
   aligning a significand based on the alignment counter; and
   computing a shifter sticky OR and storing the shifter sticky OR in the memory of the sticky computation module.

2. The method of claim 1, wherein the alignment counter comprises a value corresponding to the size of a shift to be used for an operand.

3. The method of claim 1, computing the alignment sticky bit based on the pre-computed sticky bit comprising ORing the pre-computed sticky bit and the shifter sticky OR when the alignment counter comprises a value greater than or equal to a predefined value.

4. The method of claim 3, the alignment sticky bit comprising the shifter sticky OR when the alignment counter comprises a value less than the predefined value.

5. The method of claim 1, aligning a significand based on the alignment counter comprising right-shifting the significand based on the alignment counter.

6. The method of claim 1, computing a pre-computed sticky bit comprising ORing a specified number of least significant bits of the significand.

7. A system for computing the alignment sticky bit in floating-point operations, comprising:
   an alignment counter;
   a shifter including at least a guard bit, a round bit, and shifter sticky bits; and
   a sticky computation module including at least one processor and at least one memory, the sticky computation module operable
      to compute a pre-computed sticky bit,
      to compute the alignment sticky bit based on the pre-computed sticky bit, and
      to compute and store the alignment sticky bit based on the pre-computed sticky bit by ORing the pre-computed sticky bit and the shifter sticky OR when the alignment counter comprises a value greater than or equal to a predefined value.

8. The system of claim 7, the sticky computation module further operable to compute a shifter sticky OR.

9. The system of claim 8, wherein the alignment counter comprises a value corresponding to the size of a shift to be used for an operand.

10. The system of claim 9, the alignment sticky bit comprising the shifter sticky OR when the alignment counter comprises a value less than the predefined value.

11. The system of claim 7, the sticky computation module operable to compute a pre-computed sticky bit by ORing a specified number of least significant bits of a significand.

12. A method for computing the alignment sticky bit in floating-point operations, comprising:
   computing a plurality of sticky group ORs by a sticky computation module that includes at least one processor and at least one memory, the sticky computation module part of a hardware floating-point unit of a central processing unit;
   computing a plurality of sticky group cluster ORs; and
   computing and storing the alignment sticky bit in the memory of the sticky computation module based on the sticky group cluster ORs by an alignment sticky bit calculator that includes an alignment counter, a shifter, and the sticky computation module, wherein the shifter includes at least a guard bit, a round bit, and shifter sticky bits.

13. The method of claim 12, further comprising:
   aligning a significand based on an alignment counter;
   computing a shifter sticky OR;
   determining an align count range based on the alignment counter;
   selecting a sticky evaluator from a plurality of sticky evaluators based on the align count range, the sticky evaluators based on the sticky group cluster ORs; and
   computing the alignment sticky bit comprising computing the alignment sticky bit using the sticky evaluator.

14. The method of claim 13, aligning a significand based on an alignment counter comprising right-shifting the significand based on the alignment counter.

15. The method of claim 13, wherein the alignment counter comprises a value corresponding to the size of a shift to be used for an operand.

16. A system for computing the alignment sticky bit in floating-point operations, comprising:
   a central processing unit, the central processing unit including a hardware floating-point unit,
   the hardware floating point unit having a sticky computation module with at least one processor and at least one memory, the sticky computation module operable to compute a plurality of sticky group ORs, to compute a plurality of sticky group cluster ORs, and to compute and store the alignment sticky bit based on the sticky group cluster ORs.

17. The system of claim 16, further comprising an alignment counter, the sticky computation module further operable to compute a shifter sticky OR, to determine an align count range based on the alignment counter, to select a sticky evaluator from a plurality of sticky evaluators based on the align count range, the sticky evaluators based on the sticky group cluster ORs, and to compute the alignment sticky bit by using the sticky evaluator.

18. The system of claim 17, wherein the alignment counter comprises a value corresponding to the size of a shift to be used for an operand.

19. A method for computing the alignment sticky bit in floating-point operations, comprising:
- determining n for a sticky group of size $2^n$;
- discarding n least significant bits of an alignment counter and determining a value, x, encoded in the remaining bits of the alignment counter;
- computing a plurality of sticky group ORs;
- initializing a sticky group bit array of size 2k;
- right-shifting the sticky group bit array by x bits; and
- computing and storing the alignment sticky bit based on the right-shifted sticky group bit array by a sticky computation module that includes at least one processor and at least one memory, the sticky computation module part of a hardware floating-point unit of a central processing unit.

20. The method of claim 19, further comprising:
- computing a sticky group bit array OR by ORing the k least significant bits of the sticky group bit array;
- computing a shifter sticky OR; and
- computing the alignment sticky bit based on the right-shifted sticky group bit array comprising computing the alignment sticky bit by ORing the sticky group bit array OR and the shifter sticky OR.

* * * * *